United States Patent [19]

Hill

[11] 3,980,407
[45] Sept. 14, 1976

[54] SHUTTER PLATE MOVEMENT

[75] Inventor: Edward Grant Hill, Santa Suzana, Calif.

[73] Assignee: Electromask, Inc., Woodland Hills, Calif.

[22] Filed: Jan. 17, 1975

[21] Appl. No.: 541,706

[52] U.S. Cl. ............................. 355/71; 250/511; 354/125; 354/246; 355/74
[51] Int. Cl.² ............... G03B 27/76; G03B 1/00; G21F 5/04; G21K 1/04
[58] Field of Search ................... 355/54, 71, 74; 354/245–249, 125; 250/511, 512

[56] References Cited
UNITED STATES PATENTS

| 2,670,443 | 2/1954 | Pennock et al. | 354/245 X |
| 3,580,153 | 5/1971 | Fukushima | 354/125 |
| 3,587,430 | 6/1971 | Fukushima | 354/125 |
| 3,737,227 | 6/1973 | Harter et al. | 355/74 |

Primary Examiner—Richard A. Wintercorn
Attorney, Agent, or Firm—Robert Louis Finkel

[57] ABSTRACT

A variable aperture shutter is provided with a pair of shutter blades reciprocably mounted on a drive formed by an endless belt stretched between, and driven by, a pair of capstans. One blade is attached to each side of the endless belt loop and both extend across the width of the loop. Reversible rotation of the capstans controls the separation of the blades. A light beam, aligned orthogonally with the shutter, is intercepted when the shutter blades are in the closed position, with their adjoining edges abutting. Light is permitted to pass through a gap between confronting blade edges upon controlled rotation of the capstan drive. Apertures of varied sizes and shapes may be generated by superimposing two or more shutters and selectively controlling their capstan drives.

11 Claims, 11 Drawing Figures

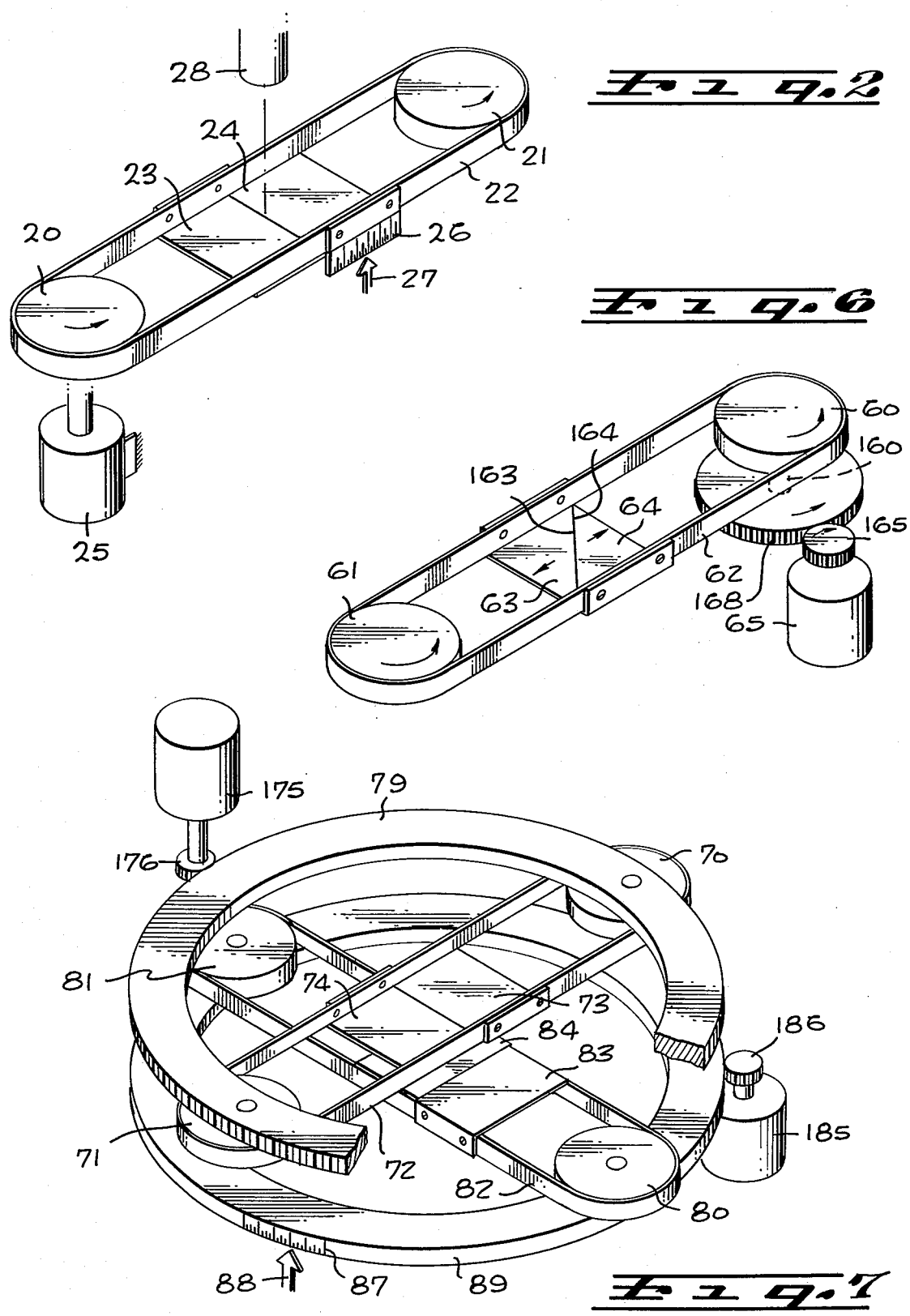

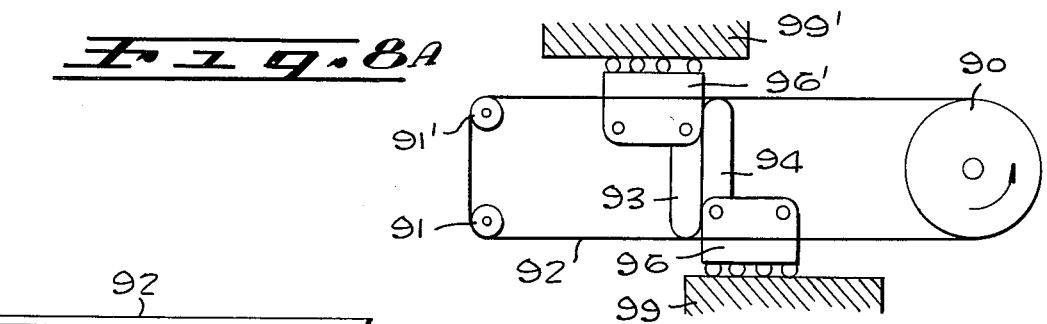
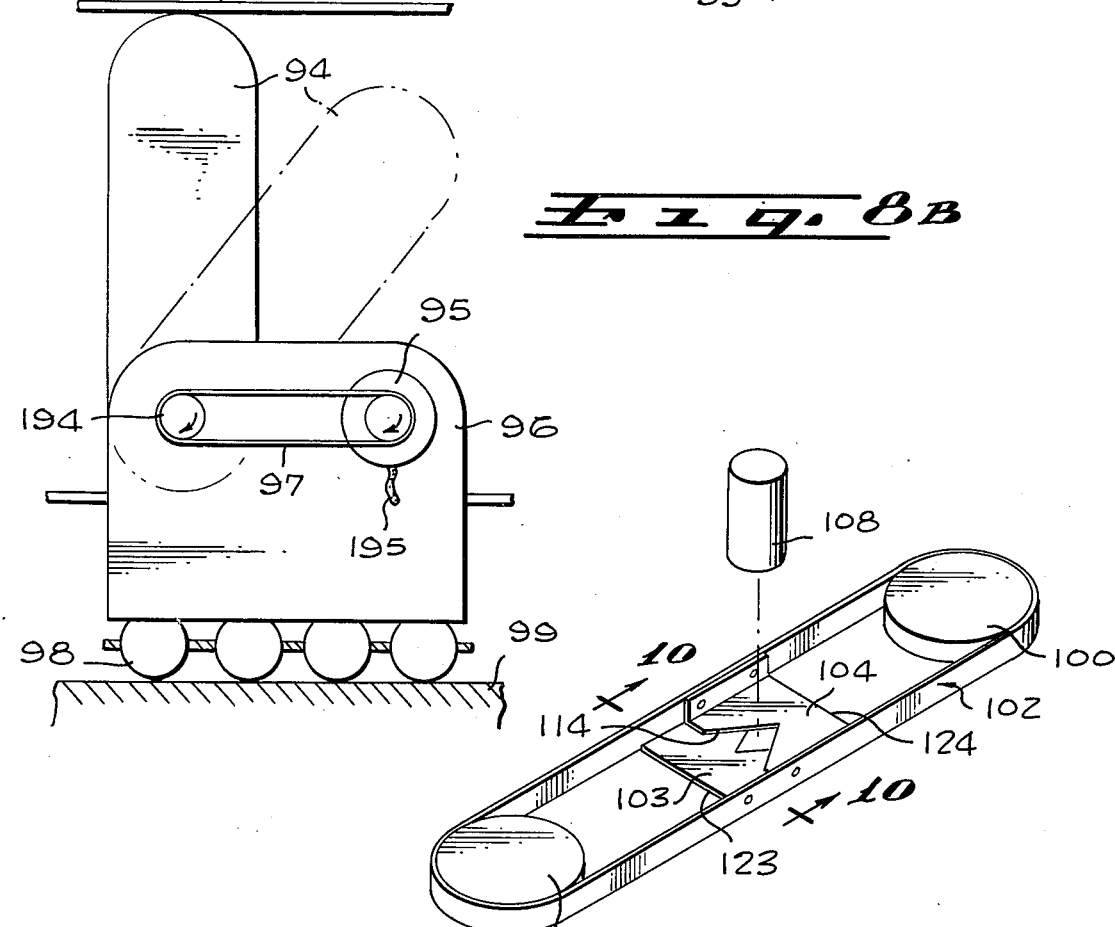
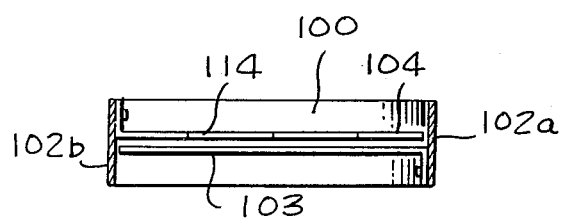

SHUTTER PLATE MOVEMENT

BACKGROUND AND SUMMARY OF THE INVENTION

This invention relates to shutter mechanisms for graphic apparatus. It relates, more particularly, to shutters whose primary function is the control of the transverse section of a light beam, rather than the period of illumination. Existing shutters are quite adequate to serve this function in most types of conventional camera and projection equipment. However, they are generally not satisfactory for use in photographic pattern generating machines, such as those typified by the pattern generator described in U.S. Pat. No. 3,722,996, commonly utilized to produce tooling plates for electronic microcircuits and solid state devices.

The primary requirement for such a shutter mechanism is the precise definition of a bounded orifice corresponding in shape, proportion and orientation to the desired pattern or pattern element on the finished product. The precision necessary to achieve the desired performance in the product is typically meausred in micro-inches. Therefore, even if the pattern generator is employed to produce a transparency at ten times the ultimate dimension of the tooling place, to be photographically reduced in a later stage of the production process, the aperture of the shutter has to be controlled within very narrow tolerances.

It is a further object of the invention to combine such precision with ease of operation in a relatively uncomplicated, economically produced mechanism of durable construction which requires little service or maintenance.

The invention attains its objects by providing a pair of planar shutter blades, reciprocable relative to each other, whose confronting edges define the aperture of the shutter. The size of the aperture is controlled by moving both shutter blades simultaneously to vary the gap between them. The shape of the aperture is defined by the configuration of the confronting edges. A mechanism employing shutter blades with parallel straight edges will produce a slit of variable width as the light-passing orifice.

The reciprocal motion of the shutter blades is achieved by providing an endless belt loop, most suitably formed by a flexible steel band, in the plane of the blades. A pair of spaced capstans or a combination of capstans and idler pulleys support the endless belt in a peripheral pattern having two parallel regions equally spaced on either side of the intended path of motion of the centers of the shutter blades. One blade is anchored to one side of the loop and the other blade is attached to the other side of the loop. A suitable power source connected to the capstan system drives the endless belt and causes the attached shutter blades to move in opposite directions.

The drive system is reversible, to allow the shutter blades to be moved to any desired positions equidistant from a predetermined aperture center, within the area bounded by the parallel portions of the belt loop.

In most instances the light transmitting aperture must be defined by more than two movable edges. Two or more shutter blade pairs, each provided with its endless belt suspension and drive, may be superimposed on each other with their axes of travel displaced at an angle.

As will be seen, the endless belt drive of the subject invention has many advantages over prior art devices relying on racks and pinions or pushrods for shutter blade movement. Its response is direct and instantaneous. Its movement is precisely controllable and repeatable. It avoids the need for camming surfaces in the drive mechanism, thereby eliminating play and backlash and it is substantially unaffected by friction and wear. These and other advantages will become clear from the following detailed description of several preferred embodiments, given with reference to the accompanying drawings.

BRIEF DESCRIPTION OF THE DRAWINGS

FIG. 2 is a perspective view, partly schematic, of a shutter assembly embodying the subject invention;

FIG. 6 is a perspective view of a shutter mechanism embodiment employing a friction wheel drive;

FIG. 7 is a partially schematic perspective view of a shutter employing a pair of shtter mechanisms with variable angular orientation in accordance with the subject invention;

FIG. 8A is a schematic plan view of a shutter mechanism embodiment employing blades movable on their mounts;

FIG. 8B is a partial enlargement of the embodiment of FIG. 8A;

FIG. 9 is a perspective view of a shutter mechanism embodiment employing non-coplanar shutter blades; and FIG. 10 is a transverse section through the embodiment of FIG. 9, taken along section line 10—10.

DESCRIPTION OF THE PREFERRED EMBODIMENTS

Figure 1:
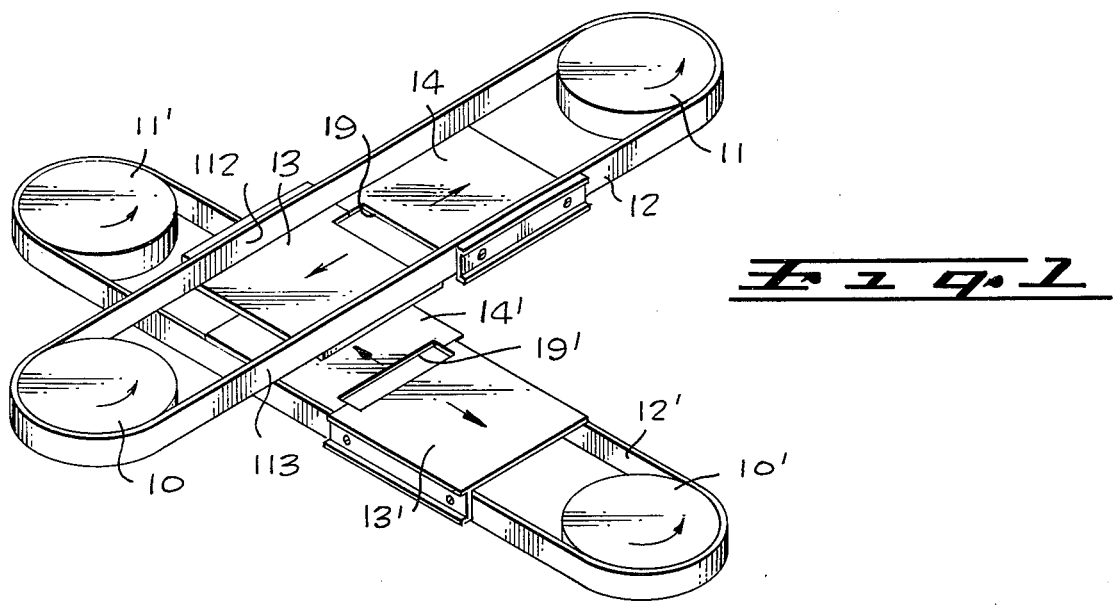
FIG. 1 is a perspective view of a shutter mechanism embodying the subject invention for generating rectangular apertures of varying size and proportions.

The perspective view of FIG. 1 illustrates the basic features of the variable aperture shutter of the invention. A pair of capstans 10 and 11, of equal diameter, are mounted in the same plane and with their rotational axes in parallel alignment. An endless belt 12 is looped around the capstans 10 and 11 and carries a pair of shutter blades 13 and 14 attached to its central portion. The shutter 13 is secured to side 112 of the belt loop; the other shutter 14 to side 113.

Clockwise rotation of the capstans 10 and 11 induces a clockwise precession of the belt 12, until the forward edges of the coplanar shutter blades 13 and 14 abut on each other. Counterclockwise rotation of the capstan drive moves the shutter blades away from each other and leaves a gap between their confronting edges.

A second shutter assembly, identical in all respects to the first one, is composed of capstans 10' and 11', belt 12' and shutter blades 13' and 14'. This shutter assembly is mounted below and at right angles to the first one.

As shown in FIG. 1, the edges 19 and 19' of the shutter blades 13, 14 and 13', 14', respectively, may be figured to define an aperture of any desired shape.

Here they are merely notched to form a narrow rectangular orifice when the blades are in abutment.

The combination shutter assembly of FIG. 1 is particularly adapted to use in step-and-repeat pattern generating machines for micro-electronic circuitry whose ultimate design comprises, or can be produced from, a collection of rectilinear elements. Such elements are formed by exposing the photoresistcoated plate in a series of isolated or adjoining illuminated rectangules of varying size and shape generated by the shutter of FIG. 1. With the blade configuration of FIG. 1, when both sets of blades 13, 14 and 13', 14' are in abutment, the illuminated area is a square centered on the common optical axis of the two shutter assemblies. Opening one or the other, or both of the shutter pairs 13, 14 and 13', 14' produces a rectangle or a larger square of illumination.

Within the dimensional limits established by the configuration of edges 19, 19', any rectangle may be generated by imposing an appropriate counterclockwise rotation of the capstans 10 and 10'. Unequal rotation of the capstans 10 and 10' results in rectangular images, equal rotation in squares.

The perspective view of FIG. 2 shows, in a partly schematic manner, the elements of a shutter mechanism with capstan 20, idler pulley 21, endless belt 22 and shutter blades 23 and 24.

In the embodiment of FIG. 2 the shutter blades 23 and 24 are machined with straight, contacting knife edges aligned at right angles to the parallel segments of the belt 22. Counterclockwise rotation of capstan 20, suitably induced by a reversible motor 25, causes the shutter blades to separate a distance proportional to that rotation and permits light, from a source 28, to pass through a slit defined by the spacing of the blades.

The control circuit of the capstan drive requires, in general, a feedback signal indicating the instantaneous position of the shutter blades. Such a position-sensing device may comprise a scale 26 attached to shutter blade 24 and a readout device 27. The illustration of the position sensing device is schematic, and any of the conventional location determining systems based on electrical resistance, coded position markers, laser interferometry or other principles may be used.

Similarly, the nature and control of the light source 28 is immaterial to the invention, provided only that the light is suitably distributed over the area of the pattern generated by shutter blades 23 and 24. Shutter blade assembly illustrated in FIG. 2 may be used alone or in combination with another shutter assembly (not shown) positioned above or below it in a configuration similar to that seen in FIG. 1.

Figure 3:
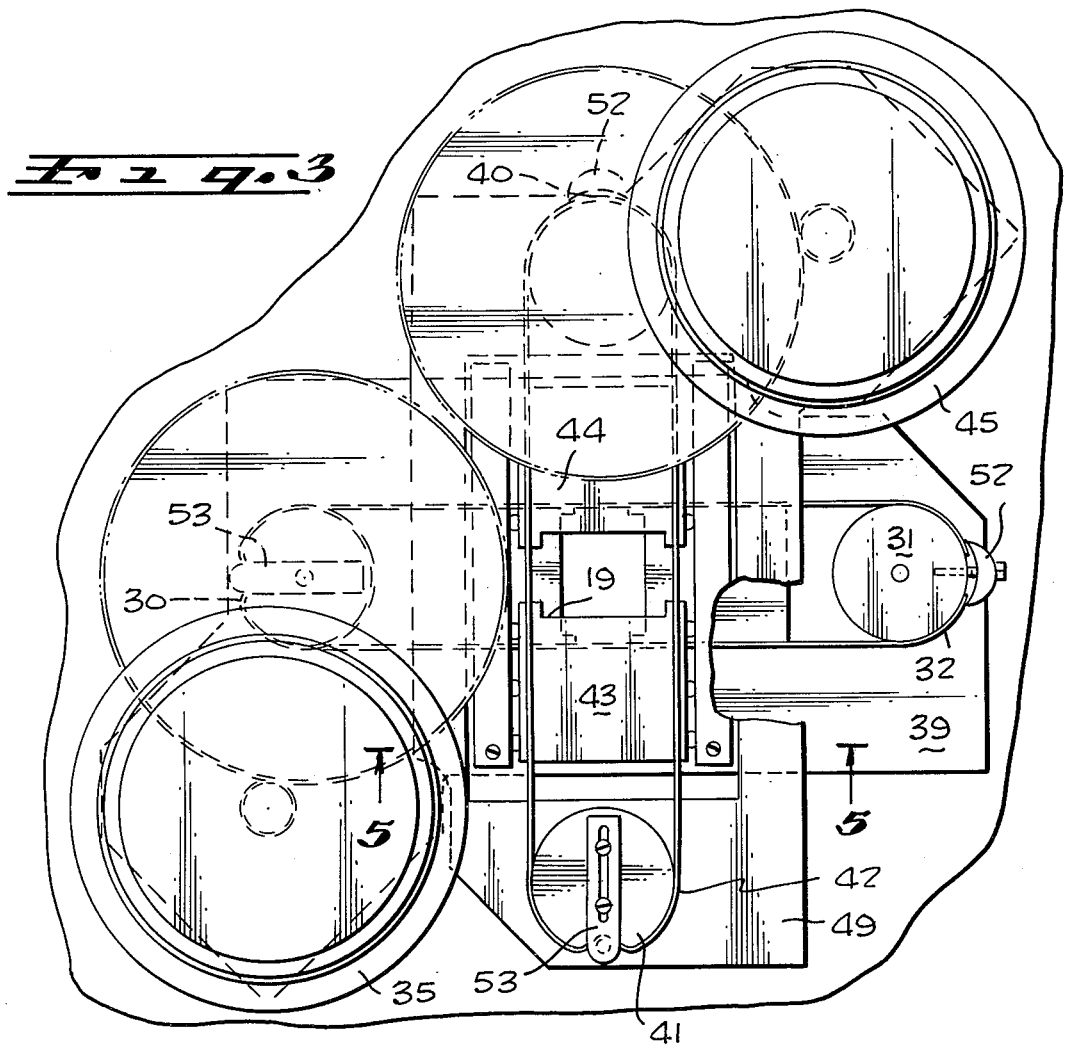
FIG. 3 is a base view of a shutter mechanism according to the subject invention with its mount and drive.

A typical pattern generating machine, employing two shutter mechanisms mounted at right angles to each other, is shown in FIG. 3. Drive systems 35, 45 supply motive power to capstans 30, 40, which, in turn, drive endless belts 32, 42. The belts 32, 42 are led over idler pulleys 31, and 41, respectively, and carry shutter blades (shown typically) 32, 44 analogous to blades 13 and 14 of the embodiment of FIG. 1.

The drive systems 35, 45 include conventional electric motors, gear reduction trains, and angular position transducers connected to the shafts of capstans 30, 40. The transducers provide the required feedback signals to the machine controls.

Figure 4:
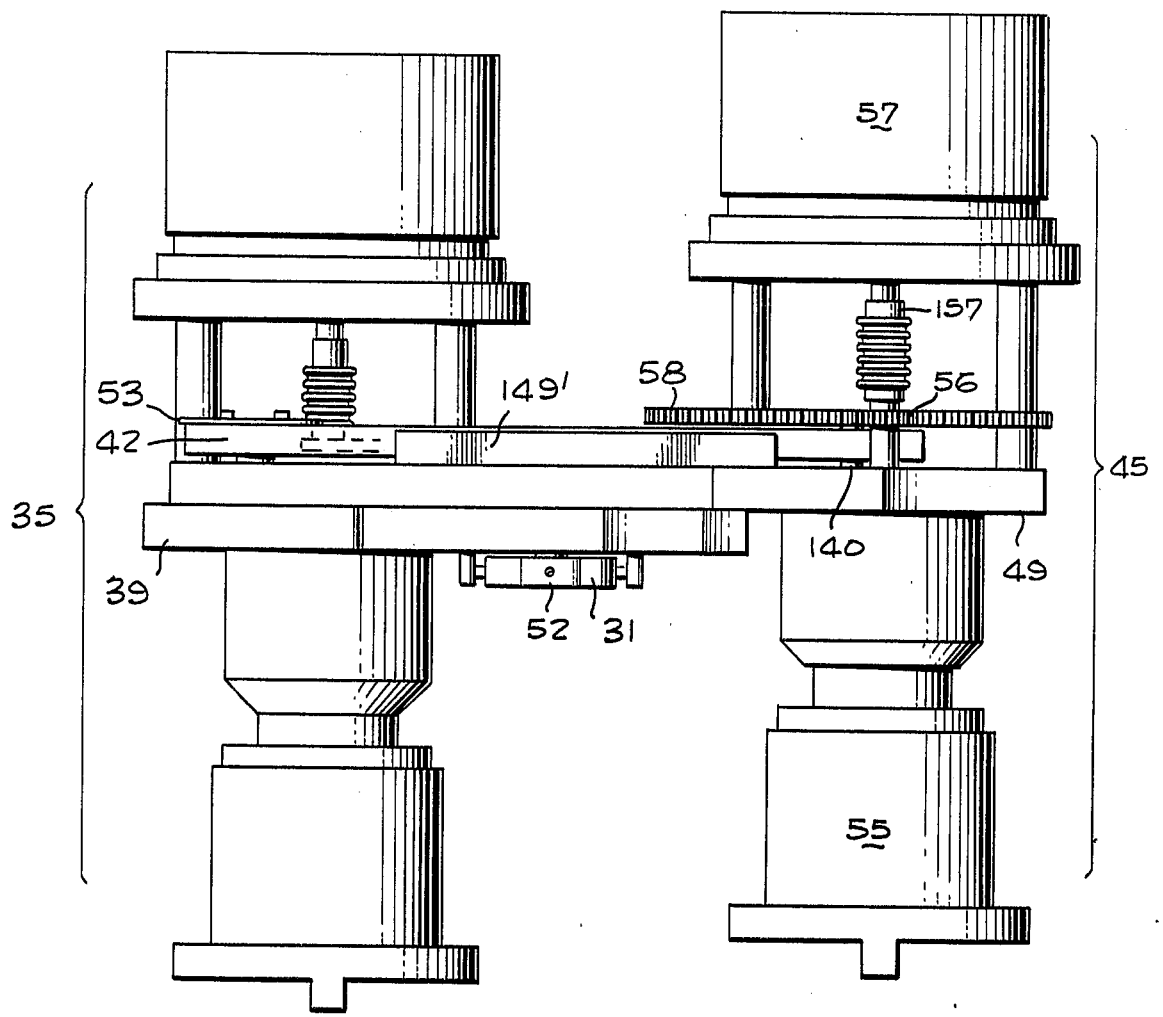
FIG. 4 is a view in elevation of the embodiment of FIG. 3.

The physical arrangement of the variable aperture shutter of FIG. 3 is also shown, in side elevation, in FIG. 4. The drive systems 35 and 45 are attached to baseplates 39 and 49, respectively.

Drive 45 includes a motor 55 whose output shaft carries a pinion 56 and is connected, through bellows coupling 157, to a shaft position encoder 57. The pinion 56 meshes with a gear 58 on shaft 140 of capstan 40. A large reduction ratio is employed to enhance the responsiveness of the drive system.

To prevent slippage of the endless belt 42 on the outer surfaces of capstan 40 and pulley 41, clamps 52 and 53 are employed. The clamp 52 is adapted to secure the belt to the surface of the capstan, while clamp 53 provides for both tension adjustment of the belt and peripheral anchoring to prevent slippage.

Figure 5:
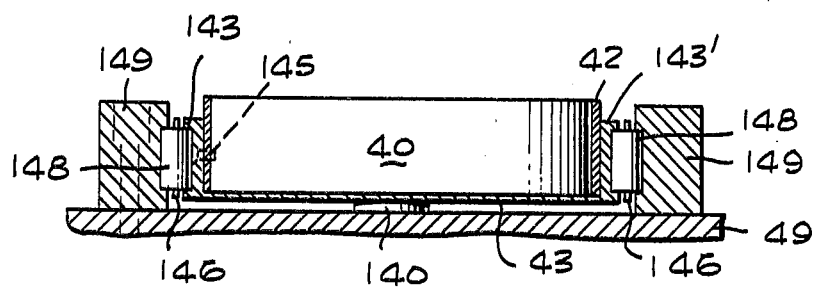
FIG. 5 is a partial transverse section of a shutter blade, its drive band and guide bearings, taken along section line 5—5 of FIG. 3.

The partial sectional view of FIG. 5, taken along section line 5—5 in FIG. 3, shows a preferred method to ensure true rectilinear motion of a typical shutter blade 43.

The shutter plate 43 is flanked by channel-like members 143, 143', parallel to each other and orthogonal to the plane of the blade. The distance between the members 143, 143' corresponds closely to the external dimension of the loop formed by belt 42. The member 143 is rigidly attached to one side of the band by common means such as rivets 145. A pair of guides 149, secured to mounting plate 49, are milled to receive bearings such as roller bearings 148. The bearings 148 are spaced by means of retainers 146 and form, in conjunction with the guides 149 and side members 143, 143' a bearing slide restricting the motion of shutter blade 43 to a plane parallel with the baseplate 49, in the plane containing the rotational axes of capstan 40 and idler 41. This bearing arrangement is duplicated for shutter blade 44 and virtually eliminates all lateral and rotational movement of both blades 43, 44, thereby ensuring their precise alignment and positioning at all times.

Yet another embodiment of the shutter mechanism of the invention is shown in the perspective view of FIG. 6. A motor 65 drives a capstan 60 through a reducing drive comprising friction disks 165 and 168. The secondary friction disk 168 is mounted on shaft 160 of the capstan 60. An endless belt 62 is stretched between capstan 60 and idler 61 with shutter blades 63 and 64 mounted to opposing parallel sides of the belt.

The shutter blades 63 and 64 are provided with forward edges 163, 164, parallel to each other and at an angle to their direction of travel. Two such shutter assemblies, mounted at right angles to each other, will generate a rectangular orifice if the blade is set at 45°. For any other blade angle the generated pattern will be a parallelogram.

When the desired pattern is required to be in the form of a general parallelogram with arbitrary vertex angle and side ratio, the construction shown in FIG. 7 may be utilized. Two shutter mechanisms, corresponding in their general construction to the embodiment of FIG. 2, are mounted on rotatable base rings 79 and 89, respectively. For clarity of illustration, the drive systems of capstans 70 and 80 and the bearing supports of the rings 79 and 89 have been omitted from the drawing. A drive motor 175 engages the periphery of ring 79 through a pinion 176; the torque transmission may be through milled gear teeth or through frictional contact. A similar drive, including motor 185 and pinion 186, operates ring 89. The instantaneous angular position of the ring 89 is determined by sensor 88, shown in schematic form, and a cooperating scale on the ring.

With this shutter system a rhomboid of arbitrary shape may be generated by a light source centered over the coincident rotational centers of the rings 79 and 89. The edge dimensions of the rhomboid are set by the openings imposed on shutter blade pairs 83, 84 and 73, 74 by the displacement of bands 82 and 72. The orientation of the rhomboid is defined by equal angular displacements of the rings 79, 89 from an arbitrary reference in the machine base. The vertex angle of the rhomboid is determined by differential rotation of the two mounting rings.

It is also possible to generate such rhomboids by controlling the angle subtended by the shutter blades themselves, with reference to their direction of travel. A mechanism to accomplish this effect is illustrated in FIGS. 8A and 8B.

In the plan view of FIG. 8A an endless belt 92 is stretched between a drive capstan 90 and idlers 91, 91'. The idlers 91, 91' are so spaced that the two sides of the loop formed by the belt 92 are parallel to each other. Blade carriers 96, 96' are fixed to alternate sides of the belt loop and mount blades 93, 94. Guides 99, 99', attached to the shutter base, cooperate with linear bearing slides 98, 98' to ensure linear motion of blade carriers 96, 96'.

The mechanism for altering the angular position of a typical shutter blade 94 with respect to its carrier 96 is shown in FIG. 8B. The blade 94 is pivoted on a shaft 194 which is also engaged by a friction drive including a motor 95 and a drive belt 97. Appropriate control signals are passed to the motor through cable 195 and cause the blade to move around its pivot, typically into a position shown by the dotted outline of the blade.

The shutter mechanism illustrated in the perspective view of FIG. 9 differs from the embodiment of FIG. 2 in having shutter blades 103, 104 in an overlapping, rather than coplanar, relationship. The drive for the shutter blades includes a drive pulley 100, idler 101, and endless belt 102. The light beam to be shaped by the shutter blades is generated in a source 108.

The shutter blade 104 has a notch 114 milled into one edge, the other, rearward, edge 124 extends linearly across the space of the belt loop, at right angles thereto. Shutter blade 103 is similarly provided with a notch 124 and a straight edge 123.

Since the shutter blades may be moved past each other, it is possible in this configuration to generate either a parallelogram, defined by notches 113, 114, or a slit, defined by edges 123, 124, by imposing suitable drive commands on the prime mover operating drive pulley 100.

The transverse section of FIG. 10, taken along section line 10—10 of FIG. 9, illustrates the manner in which integral flanges of the shutter blades 103, 104 are riveted or similarly fixed to alternate sides 102a, 102b of the endless belt 102.

Depending on the general shape of the pattern to be generated, the shutter blades 13, 14 of the embodiment of FIG. 1, or the corresponding members of the other embodiments discussed above, may be replaced by shutter blades whose light intercepting edges have a differing configuration. By way of example, if such an effect were desirable, curvilinear edges may be used to project light images without sharp corners.

It will be apparent that a plurality of superimposed shutter mechanisms, rather than just one or two, may be used for greater control of pattern shape and size if desired. These, and other, changes in the design and construction of the variable aperture shutter blade movement of the invention may be made without deviating from the teachings herein.

What is claimed is:

1. A variable aperture shutter for intercepting and shaping a beam of light emitted from a source, comprising:
    a base;
    an endless belt;
    capstan means rotatably mounted to said base, supporting said endless belt in a loop having two opposed linear regions lying in spaced parallel alignment, and imparting circulatory motion to said belt;
    reversible drive means driving said capstan means;
    a first shutter blade positioned within said loop intermediate said linear regions thereof and pivotally secured to said belt in one of said linear regions;
    a second shutter blade positioned within said loop intermediate said linear regions thereof to confront said first shutter blade and pivotally secured to said belt in the other of said linear regions;
    positioning means operatively connected to said first and second shutter blades to rotate said blades and thereby selectively adjust the angle between the confronting edges thereof and the linear regions of said loop; and
    control means controlling said drive means to vary the positions of said shutter blades and thereby vary the aperture defined by confronting edges of said blades.

2. The shutter defined in claim 1, wherein said capstan means include a drive pulley operatively connected to said drive means and adapted to impart circulatory motion to said belt, and at least one idler pulley.

3. The shutter defined in claim 1, wherein the confronting edges of said first and second shutter blades are figured to define an aperture of predetermined shape.

4. The shutter defined in claim 1, wherein said first and second shutter blades are coplanar.

5. The shutter defined in claim 1, wherein said first and second shutter blades lie in parallel, spaced planes.

6. The shutter defined in claim 1, wherein said endless belt is an elongated, flexible metal band.

7. The shutter defined in claim 1, wherein:
    said reversible drive means include an electric motor; and
    said control means include a shaft position encoder rotatably connected with said motor.

8. The shutter defined in claim 2, wherein said capstan means further comprise grip means securing said endless belt to one portion of said drive pulley.

9. The shutter defined in claim 8, wherein said capstan means further comprise adjustable tensioning means controlling the tension of said endless belt.

10. A variable aperture shutter for intercepting and shaping a beam of light emitted from a source, comprising, in combination, a pair of shutter mechanisms mounted in a frame in superimposed alignment with the optical axis of said light beam, each shutter mechanism comprising:
    a base;
    an endless belt;
    capstan means, rotatably mouned to said base, supporting said endless belt in a loop having two opposed linear regions lying in spaced parallel alignment, and imparting circulartory motion to said belt;

reversible drive means driving said capstan means;

a first shutter blade positioned within said loop intermediate said linear regions thereof and secured to said belt in one of said linear regions;

a second shutter blade positioned within said loop intermediate said linear regions thereof to confront said first shutter blade and secured to said belt in the other of said linear regions;

control means controlling said drive means to vary the positions of said shutter blades and thereby vary the aperture defined by confronting edges of said blades; and alignment means for controllably rotating the base of at least one of said shutter mechanisms about said optical axis in a plane normal to the optical axis of said light beam.

11. The shutter defined in claim 10, wherein said frame is rotatable about the optical axis of said light beam.

* * * * *